United States Patent [19]

Bothner et al.

[11] Patent Number: 4,712,906
[45] Date of Patent: Dec. 15, 1987

[54] ELECTROSTATOGRAPHIC APPARATUS HAVING A TRANSFER DRUM

[75] Inventors: Rose M. Bothner; James L. Butler, both of Rochester, N.Y.

[73] Assignee: Eastman Kodak Company, Rochester, N.Y.

[21] Appl. No.: 7,036

[22] Filed: Jan. 27, 1987

[51] Int. Cl.⁴ .................. G03G 15/16; G03G 15/01
[52] U.S. Cl. ................................ 355/3 TR; 355/4
[58] Field of Search ........... 355/3 TR, 4, 3 R, 14 TR; 118/645; 430/42, 44, 48

[56] References Cited

U.S. PATENT DOCUMENTS

| | | | |
|---|---|---|---|
| 3,612,677 | 10/1971 | Langdon et al. | 355/4 |
| 3,633,543 | 1/1972 | Pitasi et al. | 355/3 TR |
| 3,702,482 | 11/1972 | Dolcimascolo | 355/3 TR |
| 3,724,943 | 4/1973 | Draugelis et al. | 355/4 |
| 3,838,918 | 10/1974 | Fisher et al. | 355/3 TR |
| 3,848,204 | 11/1974 | Draugelis et al. | 355/3 TR |
| 3,955,530 | 5/1976 | Knechtel | 355/4 X |
| 4,072,412 | 2/1978 | Suda et al. | 355/3 TR |
| 4,082,443 | 4/1978 | Draugelis et al. | 355/4 |
| 4,095,879 | 6/1978 | Katayama et al. | 355/4 |
| 4,277,165 | 7/1981 | Wada et al. | 355/3 SH |
| 4,326,792 | 4/1982 | Landa | 355/3 TR |
| 4,403,847 | 9/1983 | Chrestensen | 355/3 TR |
| 4,415,256 | 11/1983 | Inoue et al. | 355/3 TR |
| 4,416,531 | 11/1983 | Mayer | 355/3 TR |
| 4,431,303 | 2/1984 | Hoffman | 355/3 TR |
| 4,477,176 | 10/1984 | Russel | 355/4 X |
| 4,537,493 | 8/1985 | Russel | 355/3 TR |
| 4,550,999 | 11/1985 | Anderson | 355/3 TR |
| 4,605,298 | 8/1986 | Russel et al. | 355/3 TR |

FOREIGN PATENT DOCUMENTS 0193962 10/1986 European Pat. Off.

Primary Examiner—R. L. Moses
Attorney, Agent, or Firm—Leonard W. Treash

[57] ABSTRACT

An electrostatographic copier or printer includes a transfer apparatus which transfers two or more images to the same surface in registration, for example, to form a multicolor image. The copier or printer forms large size electrostatic images on a moving image member with the long dimension of the images parallel to the direction of motion and small size images with their long dimension across the direction of motion. A transfer drum with a circumference substantially equal to the distance between comparable points on the image member between consecutive large images or pairs of small images transfers consecutive large images or pairs of small images in registration.

The preferred transfer drum is of the type which rotates secured copy sheets into transfer relation with two or more toner images to receive them in registration. The drum includes means for either securing one large copy sheet or two smaller copy sheets. This doubles the speed of the copier or printer when in the smaller sheet mode.

17 Claims, 8 Drawing Figures

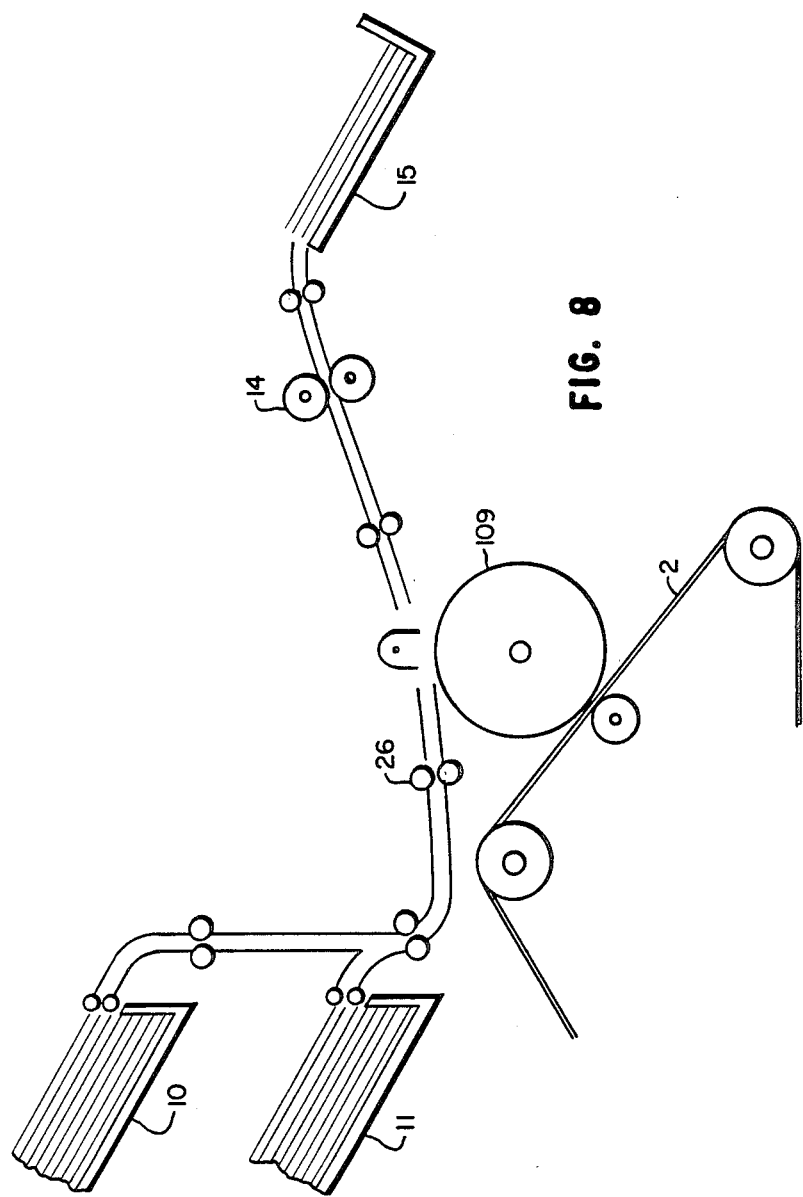

ELECTROSTATOGRAPHIC APPARATUS HAVING A TRANSFER DRUM

FIELD OF THE INVENTION

This invention relates to electrostatography, and more specifically to copiers and printers having transfer apparatus for transferring two or more electrostatically held toner images in registry to a receiving surface.

BACKGROUND OF THE INVENTION

U.S. Pat. Nos. 3,612,677 and 4,058,850 show an electrophotographic copier having a transfer drum to which a copy sheet is secured. The drum brings the copy sheet into transfer relation with two or more toner images carried on an image member to transfer those images to the copy sheet in registration. This is a common transfer apparatus for modern color copiers and has been suggested for color printers. It can also be used to combine two images of the same color.

Using such an apparatus, the circumference of the drum must be larger than the smallest dimension of the largest size copy sheet to be secured to it. When a smaller copy sheet is attached to the same drum, a portion of the drum circumference is unused. This unused circumference requires a comparable space between toner images on the image bearing member. Provision of such a space on the image bearing member reduces the output of that member at any given lineal speed, and thereby the speed of the copier or printer.

Although sizes vary around the world, a common largest size is 11 by 17 inches (approximately 28×43 cm.), commonly called "ledger" size. In the United States the most common size is 8½ by 11 inches (approximately 22×28 cm.) or "letter" size.

Electrophotographic color copiers with drum transfer apparatus of the type described commonly can accommodate ledger size images. A gripping or vacuum mechanism attaches the leading edge of the ledger size receiving sheet to the drum. If a letter size sheet is attached to the same drum in the same orientation, six inches of drum circumference must be unused. The images must be separated by that amount on the image member. Thus, the copier or printer does not operate at its optimum speed when using the smaller size. Unfortunately, letter size is likely to be the most common size used.

SUMMARY OF THE INVENTION

It is an object of the invention to provide a transfer apparatus generally of the type which can take large sized sheets, but which operates efficiently when used with small size copy sheets.

It is another object of the invention to provide an electrostatographic apparatus of the type having a transfer drum which rotates into transfer relation with more than one image to transfer those images in registration, which apparatus operates efficiently for both large and small size images.

According to one aspect of the invention, these objects are accomplished by providing a transfer drum capable of securing either one large size sheet or two smaller size sheets, each of the smaller sheets to receive their own set of toner images from the image member, in registration, during rotation of the drum.

According to another aspect of the invention, these objects are accomplished by electrostatographic apparatus having an image forming means for creating large electrostatic images on a moving image member with a long dimension running parallel with the direction of motion of the image member and for creating small electrostatic images with their long dimension running across the direction of motion, and a transfer drum having a circumference substantially equal to the distance between comparable points in consecutive large images and also equal to the distance between comparable points in consecutive pairs of small images. According to this aspect of the invention, a transfer drum capable of securing two smaller sized copy sheets is preferred, but not the only type drum usable in practicing the invention. A drum which receives the plurality of images in registration directly to the drum surface for subsequent transfer to a copy sheet also can be used.

According to a preferred embodiment of the invention, in a first mode, a large sized sheet is positioned with its long dimension around more than one half of the circumference of the drum, and in a second mode two smaller copy sheets are positioned with their short dimensions around opposite portions of the circumference of the drum. With this structure the copier or printer is set up so that the image member receives a larger sized image with its short dimension across the member and a smaller sized image with its long dimension across the member. With ledger and letter size sheets, the copier or printer operates at its optimum speed for both sizes.

According to a further preferred embodiment, the transfer drum has first and second circumferentially spaced means for attaching the leading edges of first and second copy sheets, respectively. For example, such attaching means can be sets of vacuum openings in the transfer drum approximately 180 degrees from each other. The two sets of openings communicate with separate vacuum chambers inside the drum which, although they can rely on the same source for their vacuum, are separately controllable to permit reduction of the vacuum on one set of openings for release of a first sheet while the other set of openings maintains its vacuum to hold a second sheet.

With a transfer drum according to the invention, a ledger size copy sheet is produced as in the prior art with a single sheet being wrapped most of the way around the drum and consecutive toner images on an image member being transferred consecutively to the full sheet until all the images desired are on the sheet. It is then separated from the drum for further processing. However when letter size or other smaller copy sheets are used, the images for one sheet must be alternated with the images for the other sheet. For example, if three-color, cyan, magenta and yellow images are desired on two letter size sheets attached to the transfer drum the order of images on the image carrying member can be first and second cyan, then first and second magenta, then first and second yellow images for the first and second sheets respectively.

Because of this desirability to alternate images, the invention is particularly well suited for use with an electronic printer. With such a printer, image information is stored in an image memory, facilitating alternating the color component images of the two letter size sheets. This can also be accomplished in an optical copier by appropriate document feeding apparatus or by placing two originals side by side on an exposure platen.

The invention, and its objects and advantages, will become more apparent in the detailed description of the preferred embodiments presented below.

BRIEF DESCRIPTION OF THE DRAWINGS

FIG. 8 is a schematic diagram of an alternative embodiment of the invention shown in FIGS. 1–7.

SPECIFIC DESCRIPTION OF THE INVENTION

Figure 1:
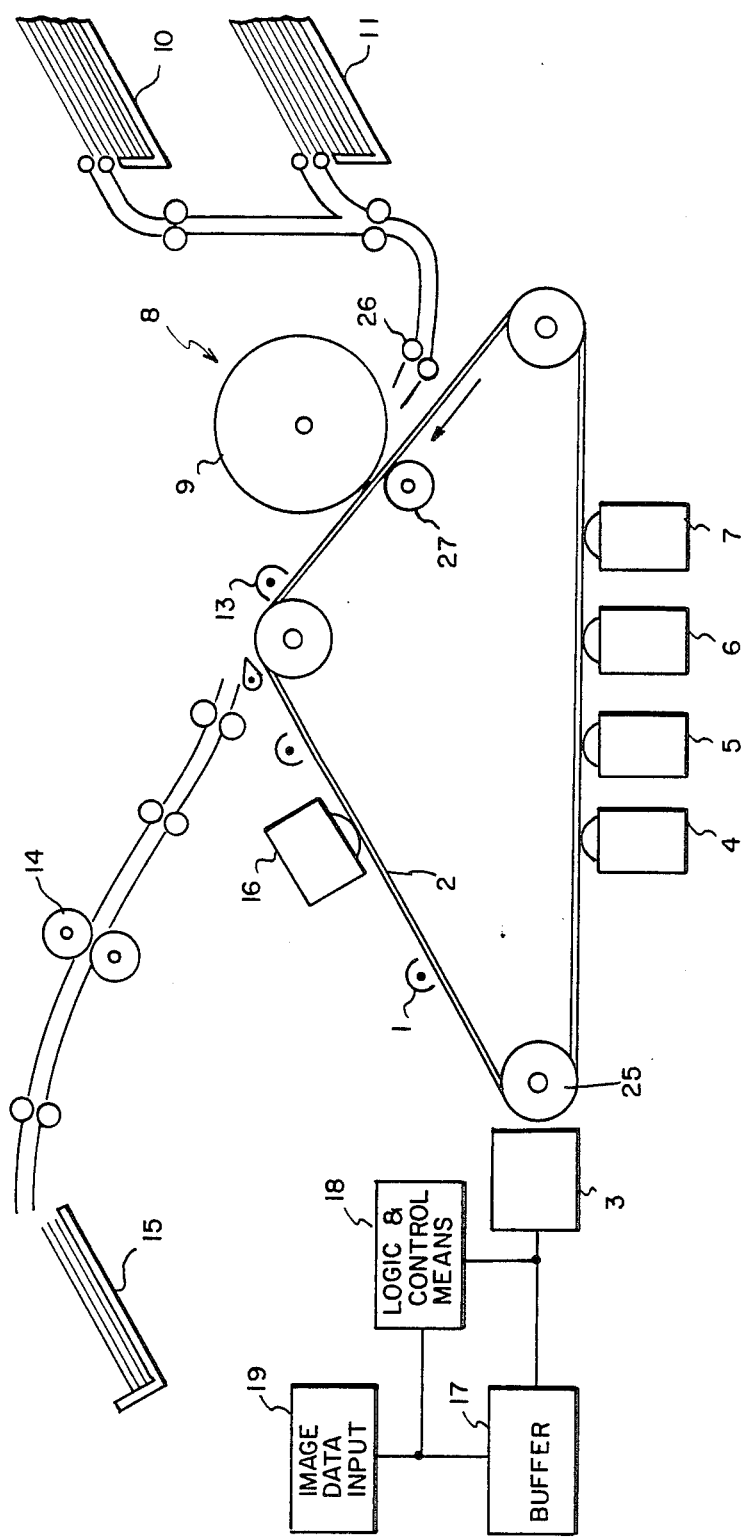
FIG. 1 is a schematic diagram of a multicolor electrostatographic printer incorporating the invention.

According to FIG. 1, electrostatographic apparatus, for example, a non-impact, electrophotographic printer, includes a charging mechanism 1 which places a uniform charge on an image member 2, for example, an endless photoconductive web mounted on rollers. An electronic exposure station 3 imagewise exposes the charged image member 2 creating an electrostatic image which is toned by one of toner stations 4, 5, 6 and 7. The toned image is then transferred to a transfer or copy sheet by a transfer apparatus 8. Transfer apparatus 8 includes a transfer drum 9, shown in more detail in the other figures and a backup roller 27 offset slightly upstream of drum 9 to create a low pressure nip. Copy sheets are fed from copy sheet supply stations 10 or 11 through a series of rollers and guides to the transfer apparatus 8. As controlled by intermittently driven rollers 26, the copy sheets are driven into engagement with and secured to transfer drum 9, and consecutive toner images are transferred to them in registry as more fully described below. To assist in transfer, drum 9 is electrically biased by means (not shown) well known in the art. Copy sheets separate from the transfer drum 9 when the securing force is removed and the copy sheet itself is separated from the image member 2 by a separation device including a corona 13. The copy sheets are transported by rollers and guides to a fuser 14 and then to a receiving hopper 15. The image member 2 is cleaned for reuse at a cleaning station 16.

Although exposure station 3 is shown as an electronic exposure station it can also be an optical exposing station with minor variations in the schematics of FIG. 1. Typical electronic exposure stations can include, for example, laser scanning apparatus or an LED printhead, both structures well known in the art.

Developing stations 4, 5, 6 and 7 can be any of a variety well known in the art. For example, they can each be a separate magnetic brush developing station containing a different color toner. For example station 4 can apply cyan toner, station 5 magenta toner, station 6 yellow toner and station 7 black toner, all as is well known in the art. They are mounted for selective toning of images so that each image receives only one of the four colors applied to it.

Copy sheet supply stations 10 and 11 are capable of storing different size copy sheets. For example, copy sheet supply station 10 includes letter size sheets oriented with their long dimension across the feed direction and short dimension parallel to it. Copy sheet supply station 11 includes ledger size sheets with their short dimension across the feed direction and their long dimension parallel to it.

Exposure station 3 responds to data fed from an image memory, for example, buffer 17 which stores information representing images to be produced. The information stored in buffer 17 is received from an image data input 19 which can be a computer, a scanner or the like. A logic and control means 18 controls the storage of the image data in the buffer and the submission of the image data, including the order of submission of the images, from the buffer to the exposure mechanism 3, all as is well known in the art.

Figure 2:
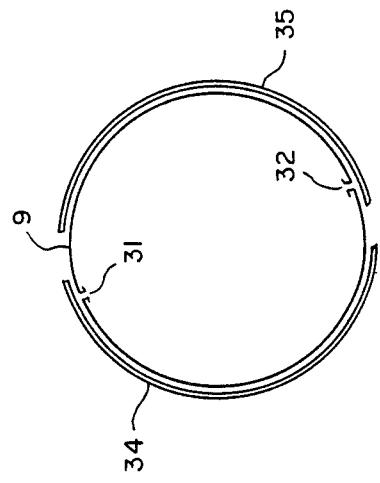
FIG. 2 is a schematic end view of a transfer drum constructed according to the invention with a single ledger size copy sheet attached thereto.
Figure 3:
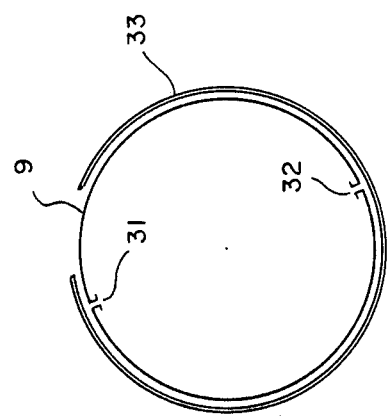
FIG. 3 is a schematic end view of a transfer drum constructed according to the invention with two letter size copy sheets attached thereto.
Figure 4:
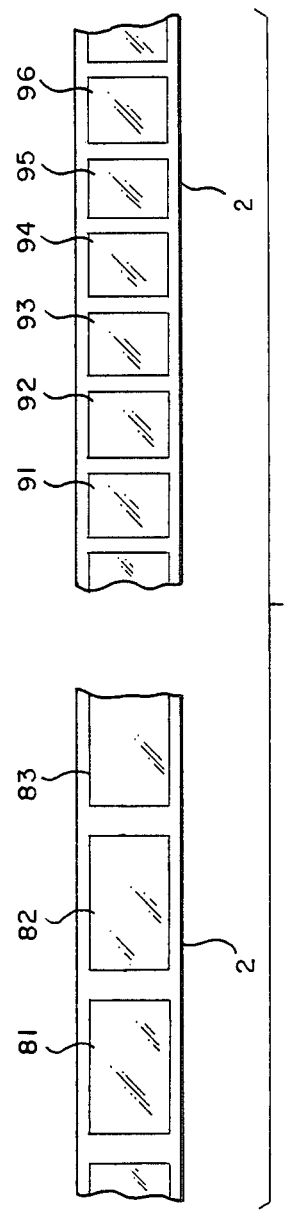
FIG. 4 is a schematic plan view of an image member with both ledger sized images and letter sized images thereon.

FIGS. 2, 3 and 4 illustrate aspects of the invention schematically. The transfer drum 9 is shown to have vacuum vents 31 and 32 separated by approximately 180 degrees. Vacuum vents 31 and 32 are actually a line of vacuum vents running the length of the drum to tack the leading edge of copy sheets.

According to FIG. 2 a ledger size copy sheet 33 is secured to the drum 9 at its leading edge by use of vacuum vents 31. In FIG. 3 two letter size copy sheets 34 and 35 have their leading edges secured by vents 31 and 32 respectively.

In operation, when a ledger size copy sheet is to be used, logic and control means 18 programs the image forming means 3 to expose image member 2 to create consecutive images suitable for transfer to a single ledger size copy sheet. For example, referring to FIG. 4 (to a smaller scale than the other Figs.), if a three color image is to be produced, three images 81, 82, and 83, representing three different color components of a multicolor image, are produced on image member 2 with the long direction of each image parallel to the direction of movement of the image member 2. One is toned with cyan, the second is toned with magenta, and the third is toned with yellow toner by the developing stations 4, 5, and 6 respectively. As the first image 81, for example the cyan image, approaches the transfer station a ledger size receiving sheet is fed from copy sheet supply 11 into contact with the drum 9 just prior to contact with the image 81, by timing and registration means well known in the art. The leading edge of the ledger size sheet is secured to the transfer drum by the vacuum produced through vents 31. As the drum rotates, the copy sheet rotates with it with the cyan toner image now transferred to the copy sheet. As the transfer drum 9 continues to rotate the leading edge of the copy sheet approaches the image member again and arrives in registry with the magenta image, image 82, which is now reaching the transfer station. The magenta image is then transferred to the receiving sheet in registration with the cyan image. The same is repeated for the yellow image, image 83, giving a transferred multicolor image according to the information supplied to the original exposure station 3. After the second transfer, after the leading edge of the copy sheet enters the nip again to receive the yellow, third image 83, the vacuum through port 31 is relieved and the copy sheet then follows the image member 2 and separates from the drum 9. It is then stripped from the photoconductor at separation station 13 and fed onto fuser 14 and copy sheet hopper 15, all as is well known in the art. Also as is well known in the art, the copy sheet can be recirculated to receive one or more images on its reverse side by a suitable mechanism, not shown.

When images are to be produced on letter size copy sheets, image forming means 3 exposes image member 2 with information to create six images, 91–96, arranged on member 2 with their short dimension parallel to the direction of movement and long dimension across the direction of movement. Images 91, 93 and 95 are the cyan, magenta and yellow components of one multicolor image and images 92, 94 and 96 are the comparable components for a second multicolor image. Copy sheets are fed out of copy sheet supply 10 with their short dimension parallel to the path of travel. They are fed into the nip of the transfer apparatus 8 with the leading edge of the first copy sheet held by vacuum vents 31 and the leading edge of the second copy sheet being held by vacuum vents 32. The drum 9 again rotates through three revolutions. The first copy sheet is separated first with the vacuum being released on vents 31 and then on vents 32 as each of those vents and the leading edge of the third image reach a single given point in the nip between the drum 9 and the image member 2.

If both sheets are receiving the same images then the logic and control 18 causes the exposure station 3 to produce two identical cyan images, two identical magenta images, and then two identical yellow images on the image member 2. If the two sheets are to receive different images, then exposure station 3 as controlled by logic and control 18 exposes photoconductor 2 with the image data associated first with first sheet cyan, then second sheet cyan, then first sheet magenta, and second sheet magenta, and then first sheet yellow, and then second sheet yellow. Although this particular mode could be accomplished in an optical copier either by using a platen with both pages one and two on the platen at the same time or by continuously refeeding pages one and two or color separations of pages one and two, it is considerably easier to accomplish in an electronic exposing device as shown in FIG. 1 using image memory or buffer 17 as controlled by logic and control means 18 to present the images in their proper order to exposure station 3.

Although the above description describes a highly preferred type of transfer drum to which the copy sheets are secured, the increased efficiency for smaller sized images can also be obtained using a transfer drum of the type known in the art and shown in FIG. 8. In this embodiment, described more completely below, images are transferred to the drum surface itself in registration and then retransferred as a multicolor image in a single transfer to a copy sheet either fed between the drum and image member, or presented to the drum at a remote location. In either the FIG. 1 or the FIG. 8 embodiment, in order for the transfer drum to receive the images in registry, it should have a circumference (taking into consideration the thickness of any copy sheets in the FIG. 1 embodiment) substantially equal to the distance on the image member between comparable points in consecutive large images and comparable points in consecutive pairs of small images.

The transfer drum 9 sees the image member as a succession of images as shown in FIG. 4. However, it should be understood that FIG. 4 is schematic and shows more image areas than would normally be present at one time on an image member. Image member 2 could of course be a quite small drum having room for one or less than one image per revolution.

Figure 5:
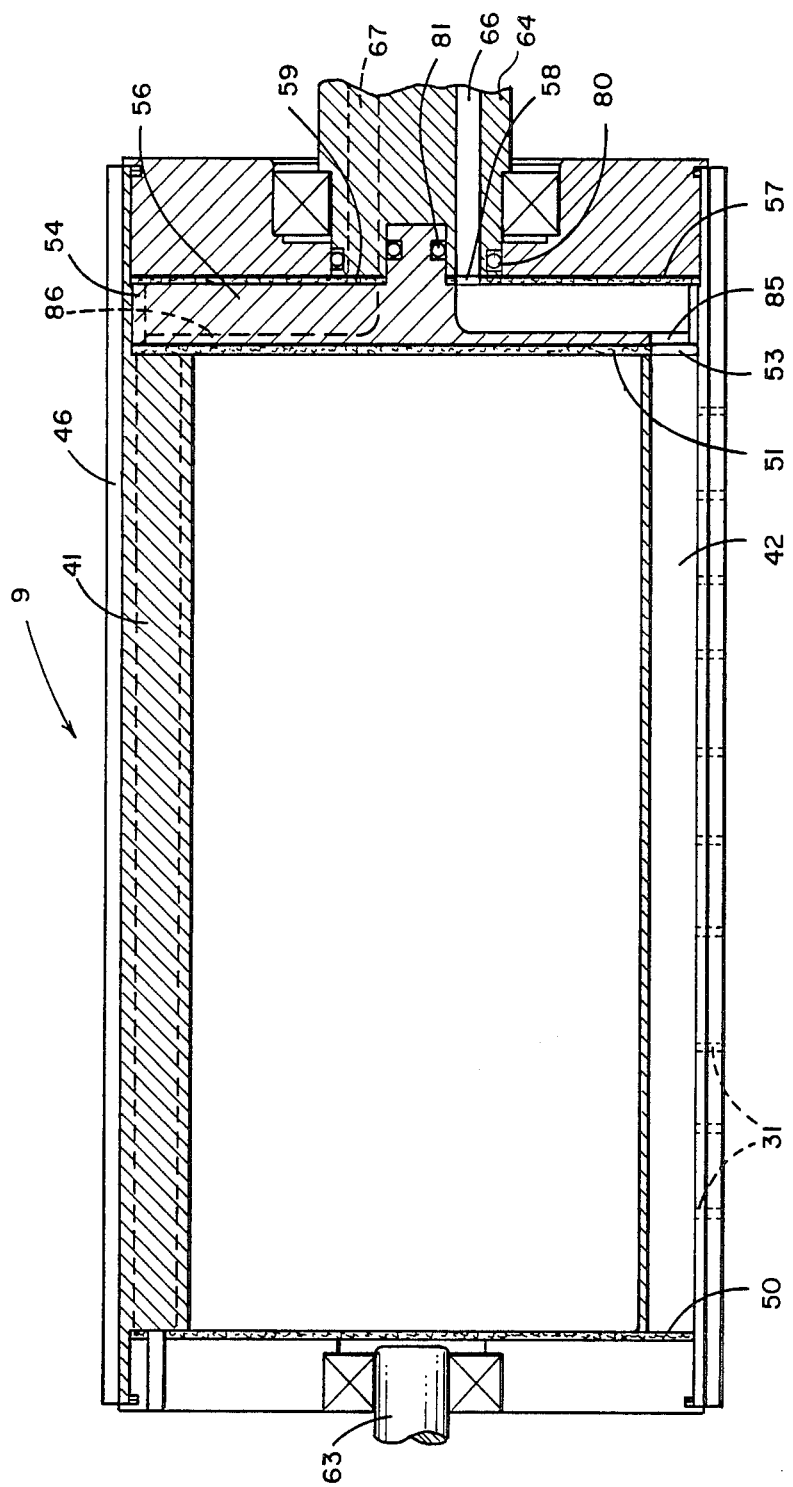
FIG. 5 is a side cross section, taken along lines 5—5 of FIG. 6, of a transfer drum constructed according to the invention.
Figure 6:
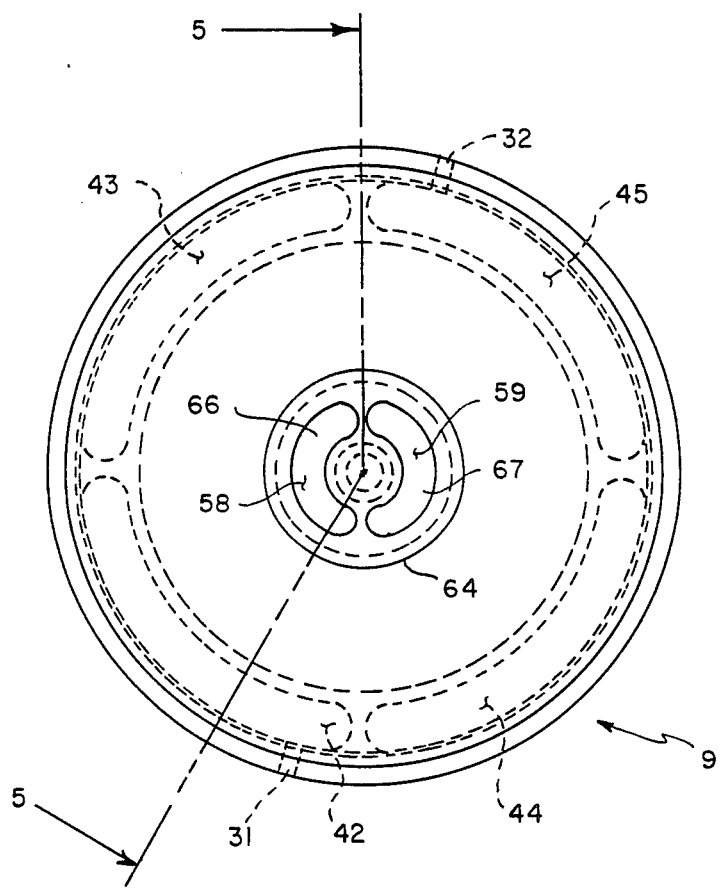
FIG. 6 is an end view with parts eliminated for clarity, of a transfer drum constructed according to the invention.
Figure 7:
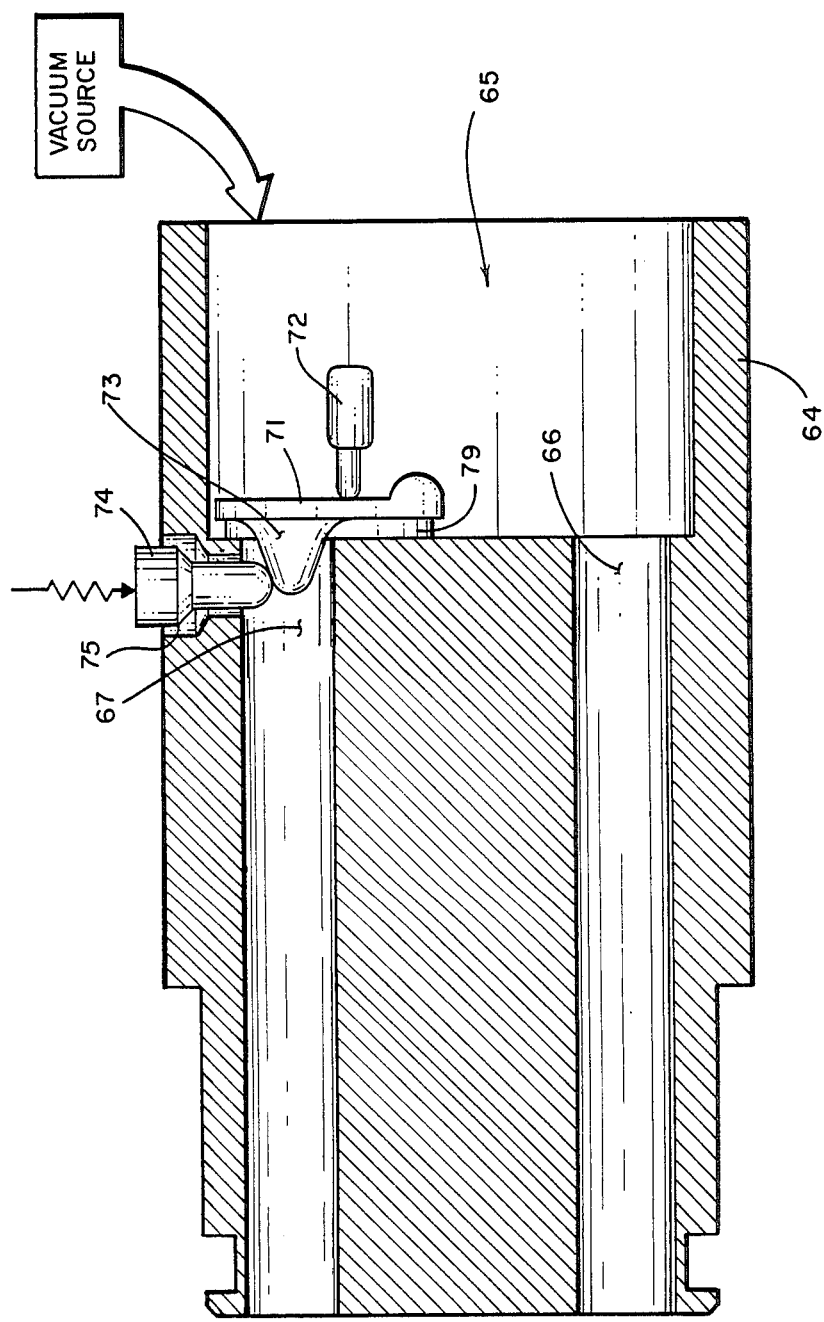
FIG. 7 is a side view of a shaft 64 for the transfer drum shown in FIGS. 5 and 6.

FIGS. 5, 6 and 7 show the details of the transfer drum 9 and the mechanism for applying the appropriate vacuums to vents 31 and 32. Drum 9 includes a metallic, hollow core 41 having four vacuum chambers 42, 43, 44, and 45. Vacuum chamber 42 communicates with the drum surface through vents 31 and vacuum chamber 45 communicates with the surface through vents 32. The surface of the drum is a thin layer of an elastomer 46 which has appropriate softness and electrostatic characteristics for this application, as is well known in the art. For example, the drum surface can be of a polyurethane having an antistatic agent added in an amount sufficient to give the resulting material a resistivity of $5 \times 10^9$ ohm-centimeters.

At opposite ends of the drum are sealers 50 and 51 which may be made of any suitable material for example tetrafluoroethylene. Sealer 50 seals the vacuum chambers 42–45 to prevent intake of air at the left end of drum 9 (as seen in FIG. 5). Sealer 51 seals the right end of the chambers 42–45 except for openings 53 which communicate with each chamber. An end cap 54 rests against seal 51 and is shaped to be in vacuum communication with the four vacuum chambers 42–45 through openings 85 and 86 in the end cap which mate with openings 53 in sealer 51. A rib 56 across the interior of cap 54 divides the cap 54 and prevents communication between vacuum chambers 42 and 43 on one side, and vacuum chambers 44 and 45, on the other side. Thus, chambers 42 and 43 are isolated from chambers 44 and 45. A seal 57 also made of tetrafluoroethylene has openings 58 and 59 which communicate with the opposite portions of the interior of the cap 54 divided by the rib 56. Thus, a first vacuum cavity means is formed between opening 58 and vents 31 through one side of cap 54 and chambers 42 and 43, a second vacuum cavity means is formed between opening 59 and vents 32 through the other side of cap 54 and chambers 44 and 45.

Drum 9 is journaled for rotation on stationary shafts 63 and 64 respectively. Seals between the shaft 64 and the drum are provided by o-rings 80 and 81. Drum 9 may be driven by any suitable mechanism, not shown, for example a gear on its periphery to rotate at a peripheral speed equal to the lineal speed of image member 2.

Shaft 64 is a complex member shown in FIG. 7 which includes a primary vacuum chamber 65 which communicates by first and second chambers 66 and 67 with openings 58 and 59. Chambers 66 and 67 are substantially the same size and shape in cross section as openings 58 and 59, which is best seen in FIG. 6. Since shaft 64 is stationary and openings 58 and 59 rotate along with drum 9, chambers 66 and 67 alternately communicate through holes 58 and 59 with vents 31 and 32. A valve structure 71 having a seal 79 is selectively actuatable by a solenoid 72 (shown schematically) to close second chamber 67. A protrusion 73 on valve member 71 engages a pin 74 when the valve member 71 is in its closed position to open a vent 75 allowing air to move into the second chamber 67 and relieve the vacuum on whichever set of chambers is communicating with chamber 67 at that position in the rotation of drum 9. Thus, with proper timing on solenoid 72 the vacuum on each set of vents 31 and 32 can be relieved momentarily by valve 71 when its communication with chamber 65 is solely through second chamber 67. Communication of each of vents 31 and 32 solely through second chamber 67 only occurs once in each drum revolution. Second chamber 67 is arcuately positioned so that vacuum reduction occurs as the leading edge of a copy sheet is contacting the leading edge of the next image for each copy sheet on the drum. If the copy sheet at that position is to be returned to the image member 2 and separated from drum 9, solenoid 72 closes valve member 71 relieving the vacuum momentarily on the vents entering the nip area. If the copy sheet is to be retained on the drum, solenoid 72 is not actuated and the vacuum in second chamber 67 is maintained.

Thus, in the example of the second mode operation described above in which two small copy sheets are secured to the transfer drum by their leading edges using vents 31 and vents 32 and the cyan images are each transferred to the two sheets, as the sheets approach the nip for the magenta images, solenoid 72 is not actuated and the vacuum is maintained in second chamber 67 so that the sheets do not release from the drum while the magenta images are transferred. After the magenta images are transferred, after the sheets are in the nip to receive the yellow images the vacuum is momentarily released first on vents 31 as the first copy sheet comes into transfer relation with the leading edge of its yellow image and then, one half drum turn later, on vents 32 as the second copy sheet comes into transfer relation with the leading edge of its yellow image.

The vacuums are relieved only momentarily by this mechanism. This means that both vents 31 and vents 32 are drawing vacuum when the transfer apparatus 8 is operating in its first mode (FIG. 2). Although the vacuum on vents 32 help hold the larger sheet on the drum, it is not necessary for applications using less stiff copy sheets, because the rest of even the large size copy sheet is adequately held electrostatically by the drum surface. Similarly, for some applications involving particular stiffness of copy sheets, humidity and drum surface characteristics, it may be useful to have more than one line of vents holding each copy sheet even when operating in mode 2 (FIG. 3). A particularly effective arrangement of vents can include, in addition to the line of vents holding the leading edge, a set of marginal vents along either or both edges of the drum which will hold the ledger sized sheets in the side margins and letter sized sheets in the top or the top and bottom margins.

An advantage of the vacuum control portion of this apparatus is that timing of the release of the vacuums to the vents 31 and 32 is controlled by the arcuate position of shaft 64, more specifically, the arcuate position of second chamber 67. Thus, it is an extremely simple mechanism that will release at the correct rotational position each time. Separate control over vents 31 and 32 is obtained with a single non rotating valve that controls only one chamber, second chamber 67.

Referring now to the embodiment shown in FIG. 8 where a transfer drum 109 receives the toned images shown in FIG. 4 directly to its surface in registration. These toned images are then transferred in one step to a copy sheet by a suitable transfer device, for example, a backup roller transfer device or an ordinary corona transfer device 110. This type of mechanism has the advantage that color to color registration is easier to maintain. However, it requires two transfers of the toner necessitating a better cleaning of the drum between copies (which can be accomplished by web or brush cleaning mechanisms well known in the art, see, for example, U.S. Pat. No. 4,058,850.) Cleaning of the drum in the FIGS. 1-7 embodiment is also desirable to prevent discoloration to the reverse side of the copy sheet.

Legal size copy sheets (approximately 22×36 cm.) can be handled either of two ways. Referring to FIGS. 2-4, a legal size copy sheet can be placed with its long dimension parallel with the direction of motion and the leading edge held only by vents 31 as in FIG. 2 or the first mode of operation of the transfer apparatus. With this approach, the apparatus will give legal size copy sheet output at the speed of ledger sized output. Alternatively, the image member 2 can be made wider and transfer drum 9 can be made longer (across the direction of motion) to accommodate legal size copy sheets in the same manner and at the same speed as letter size copy sheets, and the apparatus would operate in the second mode. Similarly, it is within the skill of the art to accommodate this invention to other sizes by adjusting orientation of the images and the size of the spaces between them on the image member.

Copy sheet registration is controlled by a pair of rollers 26 which in a start and stop action drive a copy sheet into engagement with the drum 9 a short distance in advance of the nip between drum 9 and backup roller 27. The drum itself is geared to the primary web control roller 25 which is connected to an encoder (not shown). As is well known in the art, the encoder creates a signal which is used to control the location of the electrostatic image by controlling exposure station 3, for example, by triggering actuation of an LED print head. The same encoder signal is also used to start rollers 26 to feed copy sheets into engagement with drum 9 in timed relation to the arrival of the proper vacuum vents 31 or 32. Obviously, other timing mechanisms could be used, see for example, U.S. Pat. No. 4,082,443.

The invention has been described in detail with particular reference to a preferred embodiment thereof, but it will be understood that variations and modifications can be effected within the spirit and scope of the invention as described hereinabove and as defined in the appended claims.

We claim:

1. In a transfer apparatus, for an electrostatographic copier, printer or the like, for transferring a plurality of toner images, electrostatically held to a moving image member, to copy sheets which copy sheets are moved to said transfer apparatus in timed relation with the arrival of the toner images to be transferred, said transfer apparatus including a transfer drum having means for securing a first copy sheet to the periphery of said drum and means for rotating the drum to bring the secured copy sheet into transfer relation with more than one of said images as said images are moved by the image member past the transfer apparatus, to transfer said more than one images in registration to the first copy sheet;

the improvement wherein said transfer drum includes means for securing a second copy sheet thereto to receive, in registration, its own set of toner images from the image member, during said rotation of the transfer drum.

2. Apparatus according to claim 1, wherein said transfer apparatus has two modes of operation, a first mode in which a large copy sheet is positioned with its long dimension around more than one half of the circumference of said drum, and a second mode in which two smaller copy sheets are positioned with their short dimensions around opposite portions of the circumference of the drum.

3. Apparatus according to claim 2 wherein said drum includes first and second circumferentially spaced means for attaching the leading edges of the first and second copy sheets, respectfully.

4. Apparatus according to claim 3 wherein said attaching means are controllable independently of each other.

5. Apparatus according to claim 4 wherein said attaching means include first and second sets of vacuum vents.

6. Apparatus according to claim 5 further including timing means for actuating said first set of vacuum vents, when in said first mode, in timed relation to the arrival of the first toner image and the first copy sheet at the transfer drum and for deactuating said first set of vacuum vents in response to the leading edge of the last image to be transferred to that copy sheet reaching the transfer drum, and when in said second mode, for actuating each of the first and second set of vacuum vents in timed relation with the arrival of its respective copy sheet at the transfer drum and for deactuating each of said first and second sets of vacuum vents in response to the arrival of the leading edge of the last image to be transferred to that copy sheet.

7. An electrostatographic apparatus comprising
means for forming a plurality of electrostatic images on an image member;
means for toning the electrostatic images to form toner images;
means for transferring a plurality of said images in registration to a copy sheet, said transferring means including the transfer apparatus defined in claim 2; and
means, associated with the forming means, for controlling the order of formation of the electrostatic images on the image member when said transfer apparatus is in its first and in its second mode.

8. Apparatus according to claim 7 wherein said forming means includes means for forming an electrostatic image in response to electrical signals, and said controlling means includes means cooperative with an image memory for presenting electrical signals stored in said image memory to said forming means in a first predetermined order when said transfer apparatus is in said first mode and in a second predetermined order when said transfer apparatus is in said second mode.

9. Apparatus according to claim 8 wherein said electrical images stored in said memory represent different color components of a plurality of multicolor images, and wherein said control means includes means, when said transfer apparatus is to operate in the second mode, for alternating the formation of images on the image member between two different multicolor images.

10. Apparatus according to claim 7 wherein said forming means includes means for forming electrostatic images representative of the color components of multicolor images.

11. In electrostatographic apparatus of the type in which a series of electrostatic images are formed on a moving image member, the images are toned by the application of toner thereto and the toner images are transferred therefrom, at least two of the images being transferred to the same surface in registration, the improvement comprising: image forming means including means for forming large electrostatic images on the image member which large electrostatic images have a long dimension running parallel with the direction of motion of the image member and for forming small electrostatic images which small electrostatic images have their long dimension running across said direction of motion and a transfer drum having a circumference substantially equal to the distance on said image member between comparable points in consecutive large images and equal to the distance on said image member between comparable points in consecutive pairs of small images.

12. Apparatus according to claim 11 including toning means for applying toner of different color to at least two consecutive large electrostatic images and to at least two consecutive pairs of small electrostatic images.

13. Apparatus according to claim 11 wherein said transfer drum includes first and second means for securing first and second small copy sheets to opposite circumferential halves of the drum.

14. Apparatus according to claim 13 wherein each of said first and second means includes a set of vacuum openings in the surface of the drum running in an axial direction, and said securing means further includes means for controlling application of a vacuum to the openings separately for each set of openings.

15. Apparatus according to claim 14 wherein said controlling means includes first and second cavity means rotatable with said drum and communicating separately with said sets of openings, a primary vacuum chamber, non rotatable first and second chambers positioned to communicate between said primary vacuum chamber and alternatingly with said first and second cavity means as said drum rotates, means for selectively closing said second chamber to relieve the vacuum on whichever of said first and second cavities is in communication with it to permit relief of said vacuum on each set of openings separately once during each revolution of said drum as said set of openings reaches a particular position in said rotation.

16. Apparatus according to claim 15 wherein said second chamber includes a pin movable to allow air into the second chamber, said closing means includes a movable valve member having a projection which is engageable with said pin in response to closing of said valve, to move said pin allowing air to enter the second chamber.

17. In electrostatographic apparatus of the type in which a series of toner images of different color are formed on an image member and then presented in order to a transfer drum, transferred directly to the surface of the drum in registration as the drum rotates repeatedly into transfer relationship with the image member and then transferred in one step from the transfer drum to a copy sheet, the improvement comprising: image forming means including means for forming large toner images on the image member which large toner images have a long dimension running parallel with the direction of motion of the image member and for forming small toner images which small toner images have their long dimension running across said direction of motion and a transfer drum having a circumference substantially equal to the distance on said image member between comparable points in consecutive large images and equal to the distance on said image member between comparable points in consecutive pairs of small images.

* * * * *